（12）United States Patent
Polansky et al.

(10) Patent No.: US 8,788,189 B2
(45) Date of Patent: Jul. 22, 2014

(54) AIRCRAFT CONTROL SYSTEM AND METHOD FOR REACHING A WAYPOINT AT A REQUIRED TIME OF ARRIVAL

(75) Inventors: Michal Polansky, South Moravia (CZ); Zdenek Jancik, Vysocina (CZ); Mike Jackson, Maple Grove, MN (US); Erwan Paricaud, Haute Garonne (FR)

(73) Assignee: Honeywell International Inc., Morristown, NJ (US)

( * ) Notice: Subject to any disclaimer, the term of this patent is extended or adjusted under 35 U.S.C. 154(b) by 138 days.

(21) Appl. No.: 13/602,076

(22) Filed: Aug. 31, 2012

(65) Prior Publication Data
US 2014/0067245 A1    Mar. 6, 2014

(51) Int. Cl.
*G06F 19/00* (2011.01)
(52) U.S. Cl.
USPC .......................................................... 701/121
(58) Field of Classification Search
None
See application file for complete search history.

(56) References Cited

U.S. PATENT DOCUMENTS

| | | | |
|---|---|---|---|
| 6,507,782 B1 | 1/2003 | Rumbo et al. | |
| 7,650,232 B1 | 1/2010 | Paielli | |
| 8,046,089 B2 | 10/2011 | Renfro et al. | |
| 2008/0103646 A1 | 5/2008 | Lucas et al. | |
| 2009/0259351 A1* | 10/2009 | Wachenheim et al. | 701/7 |
| 2010/0152930 A1 | 6/2010 | Coulmeau et al. | |
| 2010/0217459 A1 | 8/2010 | Caillaud et al. | |
| 2011/0270470 A1 | 11/2011 | Svoboda et al. | |
| 2011/0295501 A1 | 12/2011 | Gutierez-Castaneda et al. | |

OTHER PUBLICATIONS

Consiglio, M. C., et al.; Integration of Weather Avoidance and Traffic Separation; Digital Avionics Conference (DASC), 2011 IEEE/AIAA 30th—Oct. 16-20, 2011; pp. 3B4-1-3B4-14.
Jackson, M. R. C.: Airborne Required Time of Arrival Control and Integration with ATM, 7th AIAA Aviation Technology, Integration and Operations Conference (ATIO)—Sep. 18-20, 2007, Belfast, Northern Ireland, Published by the American Institute of Aeronautics and Astronautics, Inc., 2007; AIAA 2007-7835.

* cited by examiner

*Primary Examiner* — Thomas Tarcza
*Assistant Examiner* — Garrett Evans
(74) *Attorney, Agent, or Firm* — Ingrassia Fisher & Lorenz, P.C.

(57) ABSTRACT

A method and apparatus includes long term and short term strategies for improving 4D trajectory reliability and required time of arrival reliability. The long term strategy changes speeds along the trajectory to remove the time error in predictions. The short term strategy compensates for wind and position error, for example, by temporarily changing an aircraft guidance speed by applying a guidance margin that would either delay or prevent re-computation of the speed targets along the flight path. The predictions would use the original speed target without the guidance margin application. The guidance speed target will stay applied until the predicted time error crosses a threshold.

17 Claims, 7 Drawing Sheets

AIRCRAFT CONTROL SYSTEM AND METHOD FOR REACHING A WAYPOINT AT A REQUIRED TIME OF ARRIVAL

TECHNICAL FIELD

The exemplary embodiments described herein generally relates to managing aircraft mission profiles and more particularly to adjusting aircraft mission profiles for reaching a waypoint at a required time of arrival.

BACKGROUND

World wide air traffic is projected to double every ten to fourteen years and the International Civil Aviation Organization (ICAO) forecasts world air travel growth of five percent per annum until the year 2020. Such growth may have an influence on flight performance and may increase the workload of the flight crew. In order to handle the expected increase in air traffic, the Next Generation Air Transportation System (NextGen) will introduce major transformations in Air Traffic Management (ATM), for example, aircraft trajectory-based operations. Trajectory-based operations will manage National Airspace System (NAS) resources by requiring aircraft to precisely follow custom-made 4-D trajectories consisting of a specified path along-path time conformance requirements. This promotes prescribing and accurately following trajectories that ensure separation and optimize traffic flow management over different time horizons, which will significantly improve flight safety and performance.

However, there are three major issues associated with the 4D operational concept encountered during steady wind error environment. First, deconfliction of the airspace and prevention of a separation infringement requires a reliable 4D trajectory. It uses Required Time of Arrival (RTA) to guarantee the reliability of time of arrival at a merging waypoint (RTA waypoint). However, the reliability before the waypoint is not guaranteed. An aircraft not compliant with its 4D trajectory may allow the spacing between aircraft to become too small.

Second, the reliability of the RTA waypoint is limited if the aircraft cannot accelerate/decelerate to compensate for wind and temperature errors. To prevent this situation, aircraft typically use a "reliable RTA window" that is computed as the time at the RTA waypoint in case of maximum speeds and 95% headwind error for a first boundary and minimum speed and 95% tailwind for a second boundary. If for example, the minimum RTA is required, there is still a speed margin of the 95% headwind error that can be used for acceleration. However, if the 95% headwind really occurs, the predictions will expect the wind error to disappear and the aircraft would accelerate less than necessary to compensate for the error. This is desirable to prevent high engine activity, but if the wind error does not disappear, the aircraft will accumulate a position/time error and may saturate the guidance speed far before the RTA waypoint, resulting in the RTA being missed. The issue is symmetrical: the same will happen for the maximum RTA and steady tailwind error. To guarantee reliable RTA at a waypoint 200 NM from the aircraft in case of 95% steady wind error, the margin applied on the speed envelope would need to be about twice the 95% wind error. This is the main weakness of the RTA concept: a limited RTA reliable window size (an aircraft speed envelope at FL350 can be between 20-50 kts based on current gross weight). For a typical 95% wind error of about 8 kts (8 kts true air speed (TAS) equivalent to 5 kts calibrated air speed (CAS) at high altitude), using 10 kts (two times 5 kts) from each side of the speed envelope would drastically reduce the reliable window.

Third, in the case of RTA in descent and steady wind error, the system has to update descent speeds several times, resulting in the previously constructed descent path no longer being optimal. The pilot may have to use airbrakes/thrust to follow or recapture the descent path, resulting in less fuel efficiency, additional pilot workload, reduce passenger comfort, and aircraft structure load constraint that can reduce the residual life of the aircraft structure. From an airline perspective, this functionality may influence the cost of RTA operations. With an improvement in the RTA reliability and the reliable RTA window, an RTA selection close to airline cost & fuel policy may be made.

Accordingly, it is desirable to provide a system and method for improving 4D trajectory reliability, RTA reliability, and descent path and optimization. Furthermore, other desirable features and characteristics of the exemplary embodiments will become apparent from the subsequent detailed description and the appended claims, taken in conjunction with the accompanying drawings and the foregoing technical field and background.

BRIEF SUMMARY

A system and method are provided for an aircraft to arrive at a waypoint at a required time of arrival.

A first exemplary embodiment includes a method for providing reliability for both an aircraft four dimensional trajectory along a path to a waypoint and a required time of arrival at the waypoint, comprising enabling a temporary speed correction that compensates for wind and temperature error in addition to a long term speed profile.

A second exemplary embodiment includes a method for providing reliability for both an aircraft four dimensional trajectory along a path to a waypoint and required time of arrival at the waypoint, comprising computing a first estimated speed to reach the waypoint at the required time of arrival; computing a time difference between an estimated time of arrival at the first estimated speed and the required time of arrival; setting and maintaining a target speed equal to the first estimated speed required to reach the waypoint at the required time of arrival plus a guidance margin if the time difference between the estimated time of arrival and the required time of arrival exceeds a first time threshold, the first time threshold defined by an estimated time of arrival tolerance and the estimated time to the waypoint, the first time threshold decreasing in magnitude as the distance to the waypoint decreases and as long as it is larger than a third time threshold, wherein the third time threshold is below the first time threshold, wherein the guidance margin is a speed delta applied to the first estimated speed; updating the target speed to equal a second estimated speed required to reach the waypoint at the required time of arrival plus the guidance margin if the difference between the estimated time of arrival and the required time of arrival exceeds a second time threshold and maintaining the guidance margin to compensate for accumulated time and position error in comparison to an initial predicted trajectory; and setting the guidance margin to zero and setting the guidance target speed to equal a latest estimated speed required to reach the waypoint at the required time of arrival if the time difference goes below the third time threshold.

A third exemplary embodiment includes a system for providing reliability for both an aircraft four dimensional trajectory along a path to a waypoint and a required time of arrival at the waypoint, the system comprising a required time of arrival solver configured to calculate a first estimated speed to reach the waypoint at the required time of arrival; a trajectory predictor configured to compute in real time a time difference between an estimated time of arrival at the first estimated speed and the required time of arrival; a speed profile generator configured to set and maintain a target speed equal to the first estimated speed required to reach the waypoint at the required time of arrival plus a guidance margin if the time difference between the estimated time of arrival and the required time of arrival exceeds a first time threshold, the first time threshold defined by an estimated time of arrival tolerance and the time to the waypoint and which decreases in magnitude as the distance to the waypoint decreases and as long as it is larger than a third time threshold, wherein the guidance margin is a speed delta applied to the first estimated speed; wherein the required time of arrival solver is further configured to compute a second estimated speed required to reach the waypoint at the required time of arrival if a time error exceeds a second time threshold; wherein the speed profile generator is further configured to update the target speed to equal the second estimated speed required to reach the waypoint at the required time of arrival plus the guidance margin if a time error exceeds a second time threshold and maintaining the guidance margin to compensate some accumulated time error, wherein the second time threshold is larger than the first time threshold; and wherein the speed profile generator is configured to set the guidance margin to zero and setting the guidance target speed to equal the second estimated speed required to reach the waypoint at the required time of arrival if the time difference goes below a third time threshold.

BRIEF DESCRIPTION OF THE DRAWINGS

The present invention will hereinafter be described in conjunction with the following drawing figures, wherein like numerals denote like elements.

DETAILED DESCRIPTION

Figure 1:
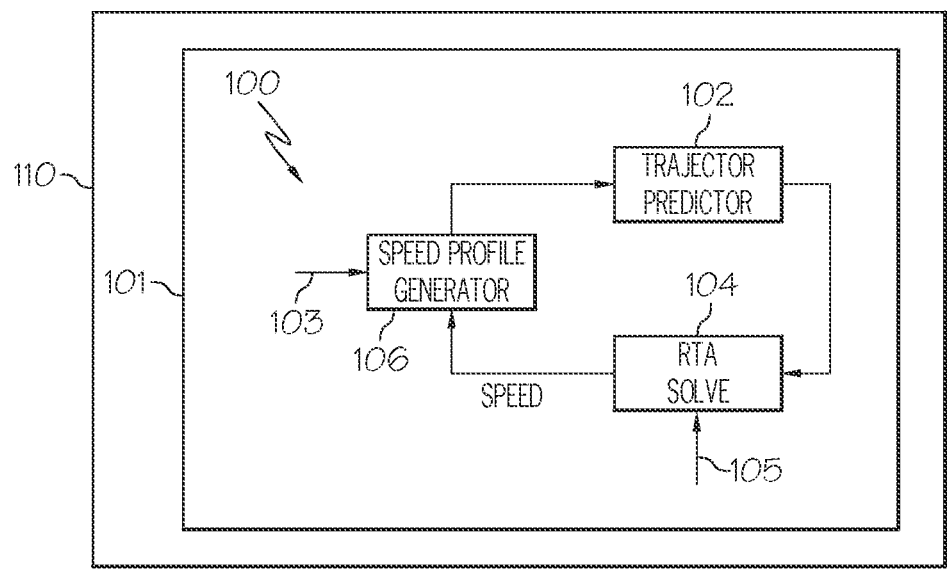
FIG. 1 is a functional block diagram of a known required time of arrival system.

The following detailed description is merely illustrative in nature and is not intended to limit the embodiments of the subject matter or the application and uses of such embodiments. Any implementation described herein as exemplary is not necessarily to be construed as preferred or advantageous over other implementations. Furthermore, there is no intention to be bound by any expressed or implied theory presented in the preceding technical field, background, brief summary, or the following detailed description.

A method and system for improving four dimension (4D) trajectory reliability and required time of arrival (RTA) reliability in accordance with an exemplary embodiment comprises modifying the long term speed profile, and triggering and disengaging the modification in a way that is not reflected in the flight plan predictions.

A guidance margin (GM) is triggered once the GM threshold is exceeded without re-computation of the speed profile. The GM is applied in Guidance only. This results in the possibility of slightly exceeding any speed constraint or limit. The GM is applied independently on the speed re-computation. This new approach leads to smaller speed adjustments, which desirably reduces, for example, engine variation, guidance mode switching, airbrakes requests, and thereby increases flight smoothness.

The exemplary embodiments use two different strategies when performing 4D operation in an environment with weather uncertainties. First, a long term strategy of changing the speeds along the trajectory to remove the time error in predictions, while smooth and economic, fails by itself in case of steady forecast error. Second, by combining a short term strategy with the long term strategy compensates for that weakness.

Various strategies could be applied that are based on short term action compensating the current wind error and position error. One strategy would be to temporarily change the aircraft guidance speed target by applying a guidance margin (constant or adjustable) that would either delay or prevent re-computation of the speed targets along the whole trajectory. The predictions would use the original speed target without the guidance margin application. The guidance speed target will stay applied until the predicted time error crosses a threshold.

An adjustable guidance margin could be an adjustable value computed with respect to, for example, weather error (wind error plus temperature error), distance to the RTA waypoint, and speed. This would also smooth speed changes in a calm environment (low wind uncertainties). To guarantee the reliability in case of 95% wind error, it needs the guidance margin equivalent to that value: about 5 kts CAS (8 kts TAS) in high altitudes to compensate for the typical 95% weather error (8-12 kts).

This mechanism will stop or reduce the accumulation of the time delay and position error. If the guidance margin is not sufficient, the time error at the RTA waypoint would exceed some threshold, resulting in the speed target being recomputed in accordance with the long term strategy. The new aircraft guidance target would be a mix of long term strategy speed and guidance margin applied to recover some position/time error.

With the exemplary embodiments, the re-computation of the speeds along the trajectory would be less frequent or not necessary, reducing the risk of speed saturation before the RTA waypoint, reducing the need for speed break, and keeping the 4D trajectory close to its original definition. If only small changes in speed occur during a vertical trajectory, for example, during climbs and descents, the descent vertical trajectory would remain close to the optimal one. The exemplary embodiments minimize the variation of the vertical trajectory by reducing occurrences of vertical path recapture maneuvers. These maneuvers often require use of airbrakes that are not efficient from a fuel, noise or comfort perspective. A benefit of the exemplary embodiments is the higher reliability of the 4D trajectory and the RTA reliability in all flight phases, which is the key enabler of the future air traffic management concept developed under SESAR and NEXTGEN projects.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

For the sake of brevity, conventional techniques related to graphics and image processing, navigation, flight planning, aircraft controls, aircraft data communication systems, and other functional aspects of certain systems and subsystems (and the individual operating components thereof) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The known long term strategy mentioned above is accomplished by an algorithm within a flight management system 101 associated with the aircraft 110 in accordance with the exemplary embodiment of diagram 100 of FIG. 1. A trajectory predictor 102 computes the ETA A RTA solver 104 determines the speed adjustment in response to a signal 105 providing the RTA. A speed adjustment parameter, determined from the ETA and ETA partial derivatives, and the speed adjustment, is applied by the speed profile generator 106. The algorithm converges quickly in several passes around the diagram 100, depending upon the magnitude of the time error at the initial speed profile 103.

In order to reject disturbances encountered during flight, the algorithm is executed repeatedly during the flight based on the latest navigational sensor data. Since each iteration of the algorithm requires a full pass of the trajectory predictions to perform, it will execute periodically, for example every 1 to 10 seconds, depending upon the speed of the FMS processor. During this interval, the speed profile generated from the most recent iteration is sent to the vertical guidance system.

To ensure that the ground-based conflict probe retains accuracy with the aircraft autonomously changing the speed profile, the 4D trajectory can be periodically down-linked to the Air Traffic Management system automatically. By placing the RTA constraint, or constraints, at appropriate choke points or aircraft trajectory crossing points, the autonomous speed modifications by the aircraft will ensure that the trajectory remains conflict-free with a minimum of controller workload. The resulting aircraft trajectory retains the desired FMS speed profile shape familiar to pilots, while allowing errors due to wind uncertainty in portions of the trajectory that are not critical to the traffic situation in order to reduce throttle activity, fuel consumption, and engine wear.

Figure 2:
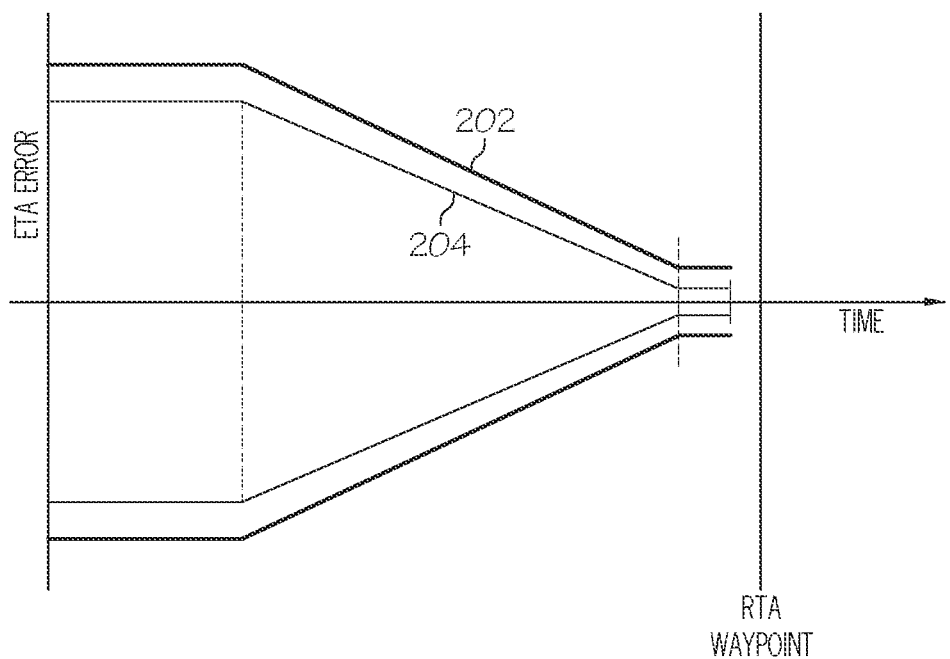
FIG. 2 is a graph of error from a predicted trajectory versus time from a waypoint in accordance with an exemplary embodiment.

FIG. 2 is a graph of ETA error (the difference between when the aircraft is expected to reach the waypoint (based on actual flight data) and the required arrival time) versus time to reach the waypoint. A first threshold 202 (outer funnel) illustrates the long term strategy of changing the speeds along the trajectory to remove the time error in predictions. A second threshold 204 (inner funnel) illustrates the short term strategy for compensating the current wind error and position error. Preferably, the ETA error versus time to the waypoint for an aircraft will remain within the second funnel 204. However, should the predicted time error at the waypoint (required time of arrival point) intersect the second funnel 204 (short term strategy using GM), the aircraft speed would be changed to compensate for the wind error.

Figure 3:
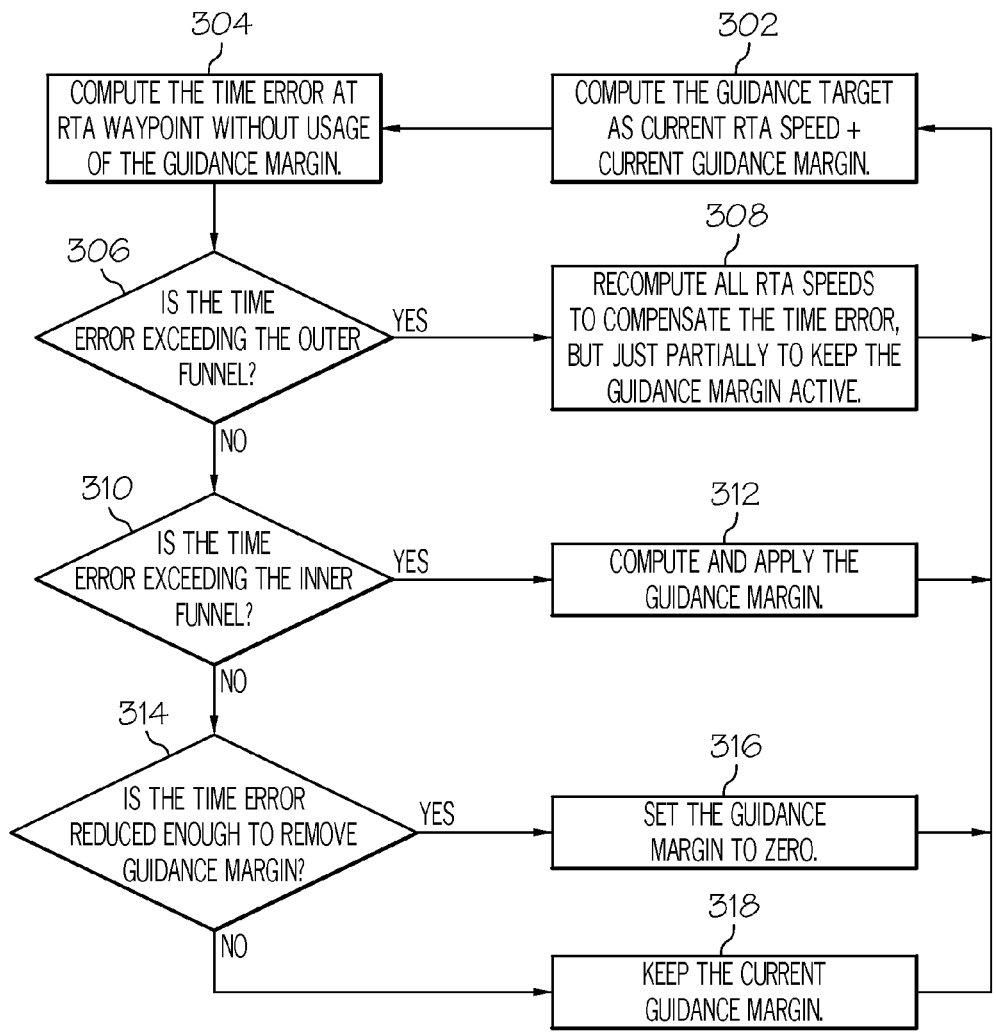
FIG. 3 is a flow chart of a method for reaching the waypoint at the required time of arrival in accordance with the exemplary embodiment.
Figure 4:
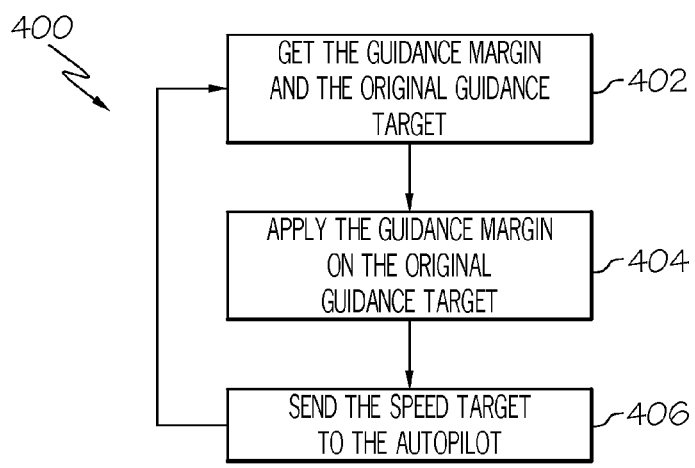
FIG. 4 is a flow chart of a method for determining the speed required of the aircraft in accordance with the exemplary embodiment.
Figure 5A:
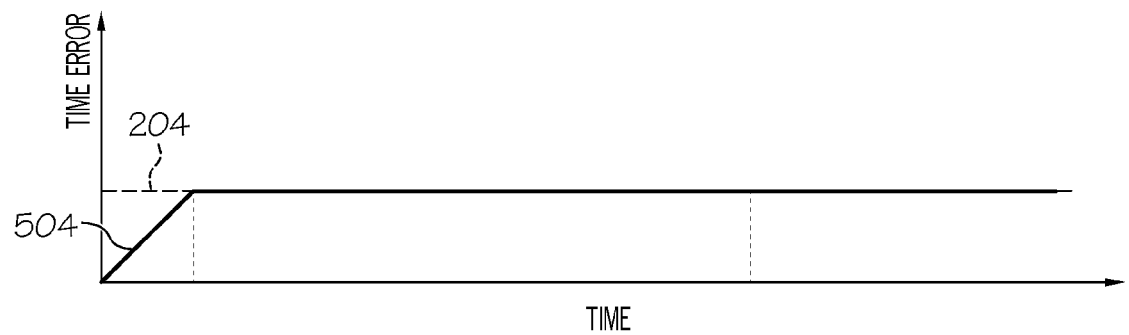
FIG. 5 is a graph comparing time verses time error, the original speed target, and the guidance margin for an equivalent guidance margin and steady state wind error.
Figure 5B:
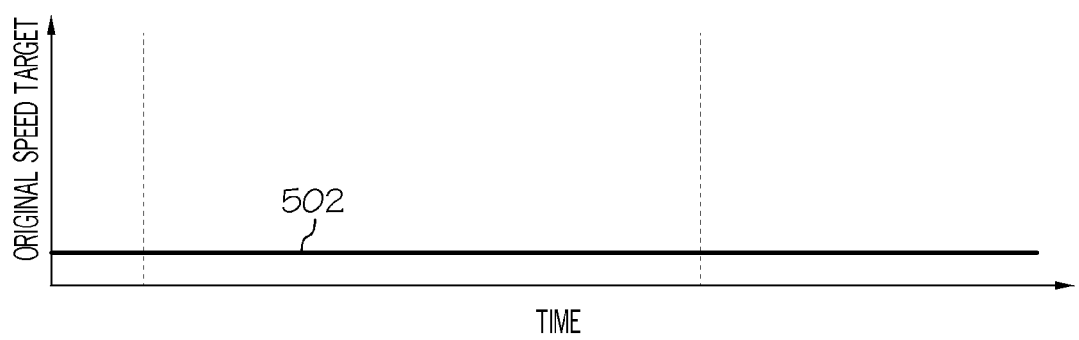
Figure 5C:
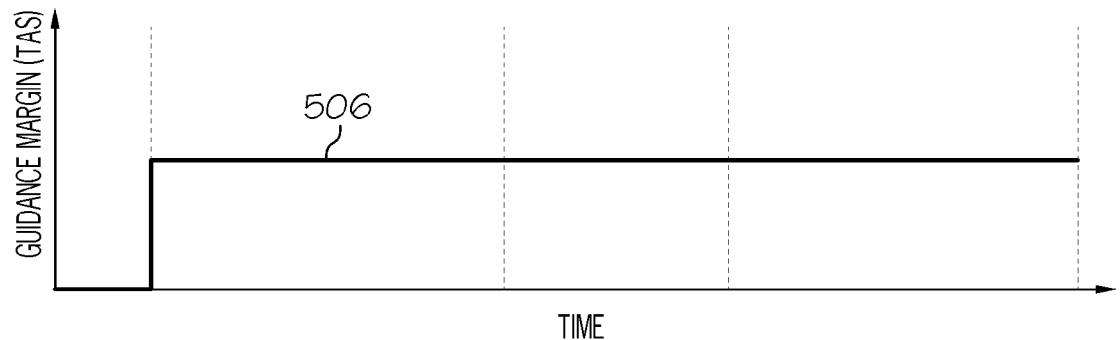
Figure 5D:
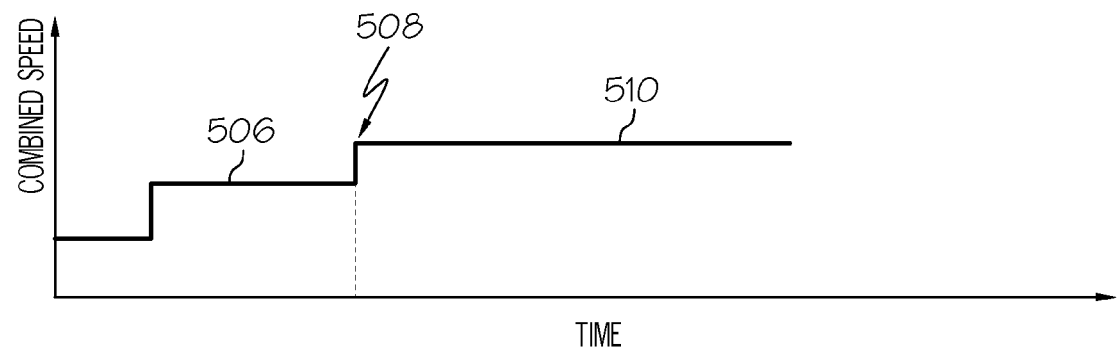

FIGS. 3 and 4 are flow charts that illustrate an exemplary embodiment of processes 300, 400 suitable for use with a system for improving four dimension (4D) trajectory reliability and required time of arrival (RTA) reliability. The various tasks performed in connection with processes 300, 400 may be performed by software, hardware, firmware, or any combination thereof. For illustrative purposes, the following description of processes 300, 400 may refer to elements mentioned above in connection with FIGS. 1 and 2. In practice, portions of processes 300, 400 may be performed by different elements of the described system, e.g., a processor, a display element, or a data communication component. It should be appreciated that processes 300, 400 may include any number of additional or alternative tasks, the tasks shown in FIGS. 3 and 4 need not be performed in the illustrated order, and processes 300, 400 may be incorporated into a more comprehensive procedure or process having additional functionality not described in detail herein. Moreover, one or more of the tasks shown in FIGS. 3 and 4 could be omitted from an embodiment of the processes 300, 400 as long as the intended overall functionality remains intact.

Referring to FIG. 3, the guidance target at the current RTA speed and current guidance margin is computed 302 and the time error at the RTA waypoint without usage of the guidance margin is computed 304. If the time error exceeds 306 the first threshold 202, the RTA speeds are recomputed to compensate for the time error while keeping the guidance margin active. If the time error does not exceed 306 the first funnel 202, and the time error exceeds 310 the second funnel 204, the guidance margin is computed and applied 312. If the time error does not exceed 310 the second funnel 204, and the time error has been reduced sufficiently to remove the guidance margin 314, the guidance margin is set to zero 316. If the time error has not been reduced sufficiently to remove the guidance margin 314, the guidance margin is not changed 318. Subsequent to steps 308, 312, 316, and 318, step 302 is repeated.

FIG. 4 illustrates the guidance module process 400, including obtaining 402 the guidance margin and the original guidance target from the above process, applying 404 the guidance margin on the original guidance target, and providing 406 the speed target to the autopilot.

The graph of FIG. 5 illustrates for the combined short term strategy and the long term strategy for an equivalent guidance margin and at a given speed 502, for example 400 kts, when the time error for the time to ETA 504 reaches the second funnel 204 (threshold), the guidance margin 506 in true airspeed is increased, and added to the original speed target to be sent to the autopilot. If the time error continues to increase, and exceed the outer funnel 206 at point 508, then the long term strategy will apply an additional speed target increase 510, combined with the guidance margin 506.

Figure 6A:
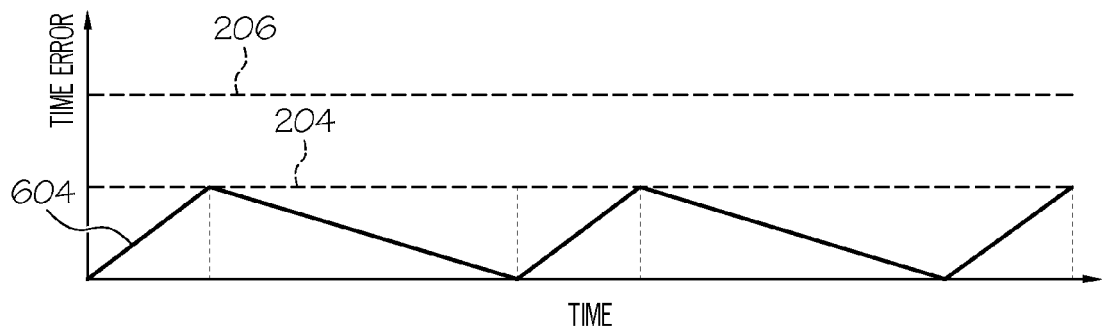
FIG. 6 is a graph comparing time verses time error, the original speed target, and the guidance margin for a lower steady state wind error.
Figure 6B:
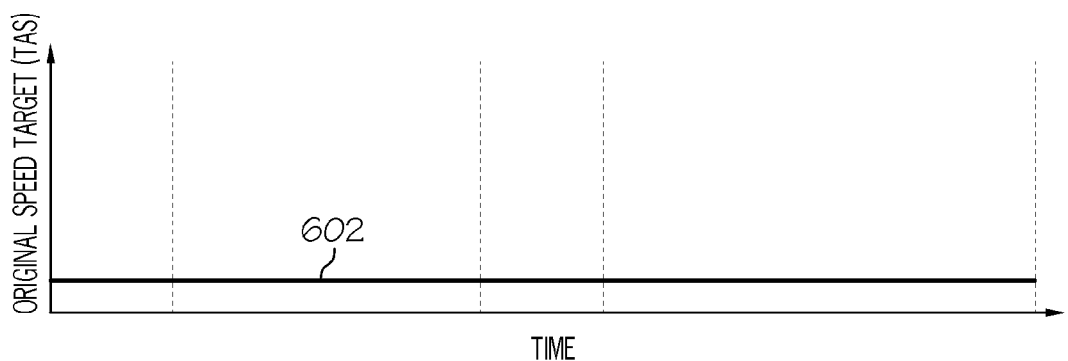
Figure 6C:
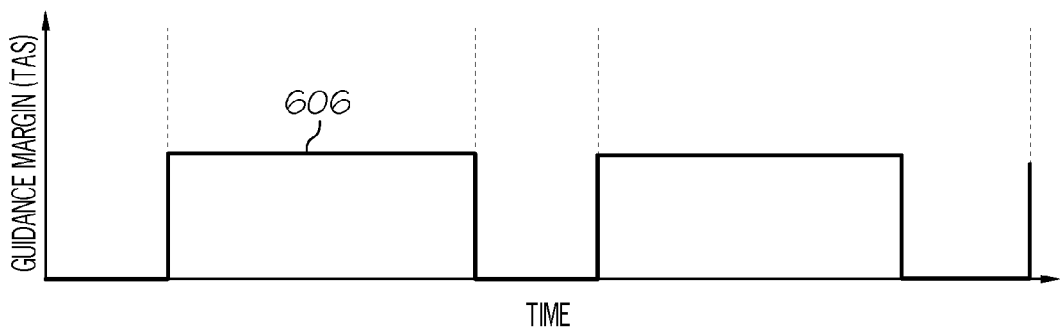
Figure 7A:
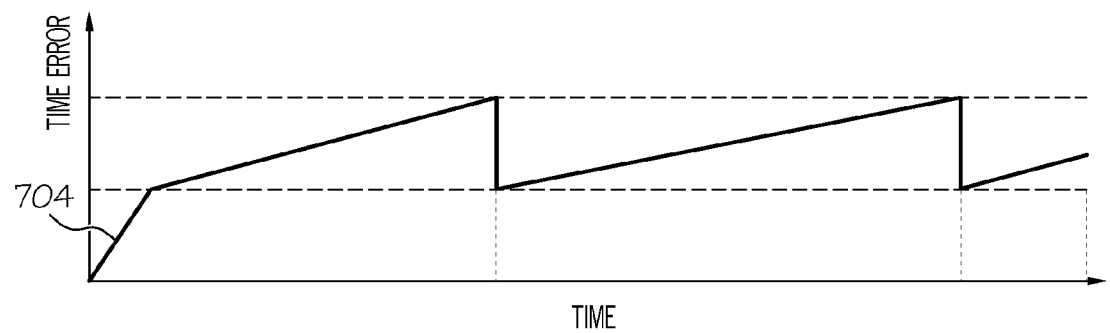
FIG. 7 is a graph comparing time verses time error, the original speed target, and the guidance margin for a higher steady state wind error.
Figure 7B:
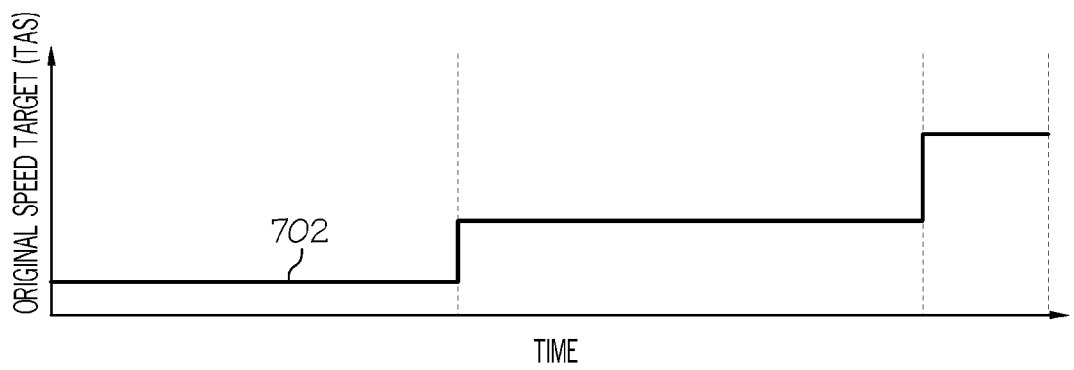
Figure 7C:
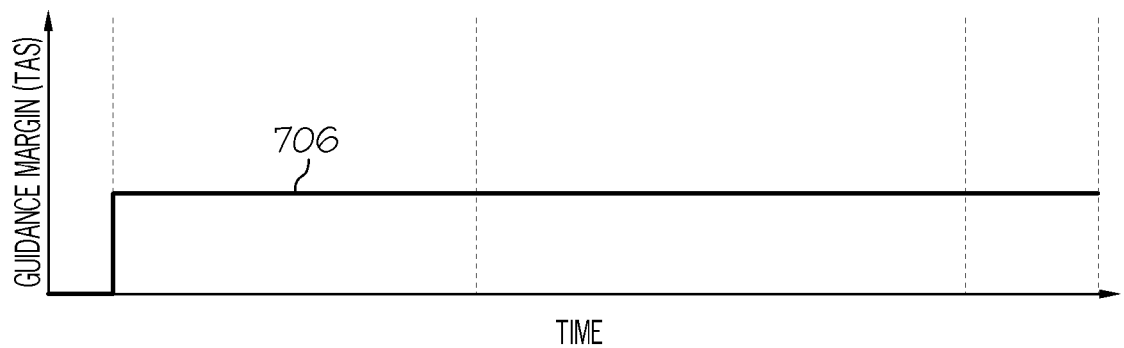
Figure 7D:
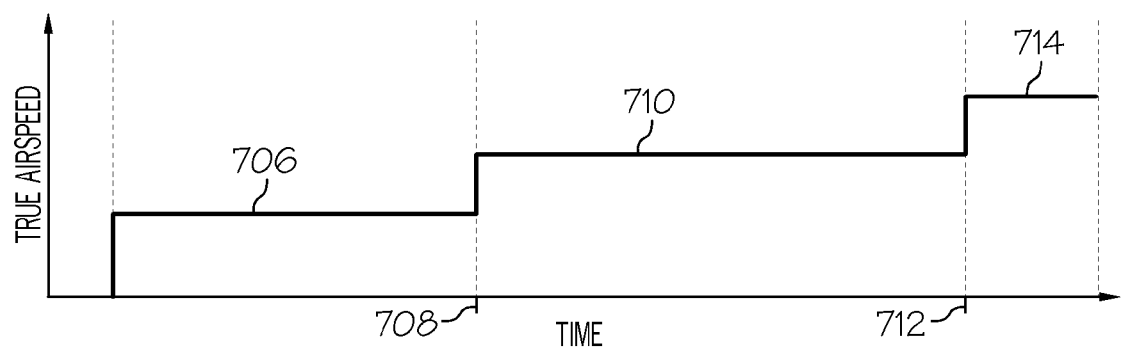

The graph of FIG. 6 illustrates for the combined short term strategy and the long term strategy for a lower steady state wind error and at a given speed 602, for example 400 kts, when the time error for the time to ETA 604 reaches the second funnel 204 is reached, the guidance margin 606 is increased, and when the time error and time to ETA reaches zero, the guidance margin 606 is decreased.

The graph of FIG. 7 illustrates for the combined short term strategy and the long term strategy for a higher steady state wind error, when the time error 704 for the ETA increases to the second funnel, the guidance margin 706 is increased. As the time error 704 continues to increase and eventually reaches the first funnel 202, the speed is increased at point 708 to the speed 710, wherein the time error 704 drops to the first funnel at point 708. If the time error 704 continues to increase and again reaches the first funnel 202, the speed is increased at point 712 to the speed 714. This increase in time error 704 and airspeed continues until the waypoint is reached.

The implementation can be done in any RTA capable FMS, but also within an Autopilot or other system using information of time error, and 4D trajectory variation monitoring that would be provided by a RTA capable FMS.

There are multiple ways to determine when to apply the guidance margin speed and when to stop its application. The mechanism can be used either always during the 4D operations or only when the aircraft speed gets close to the speed envelope. There might be considered various other conditions. The triggering can use the position error or the time error estimation. In case of time error based threshold, the guidance margin could be applied when the long term strategy leads to a speed adjustment along the whole trajectory.

The threshold is typically 5 to 9 seconds in case of a 10 seconds RTA tolerance with the RTA waypoint within the next 200 NM. The full speed adjustment would be triggered, once the time error exceeds the RTA tolerance. However the long term speed update would not compensate the whole 10 seconds, but just the 5 to 9 seconds (with the objective to remain active to converge with the GM for resetting to zero). The speed update would be the same as in the current long term strategy. The guidance margin would be maintained, the pilot would see the speed increase to compensate for the headwind error, and the total time error reducing slowly.

In case the wind error is less than the change in speed, the time error would decrease. When the time error gets compensated due to being below a threshold, the delta speed would be removed and original speed target would be used.

The value of the guidance margin could be either constant or computed based on the situation. To guarantee the RTA reliability even when the RTA is on the edge of the current RTA reliable window, it should be at least equal to the 95% wind error, but it would increase the reliability and performance even if the value is much lower. So it can be simply set to some constant value, e.g. 0.01 Mach or 5 kts CAS. It was confirmed by a human factors study in the European ERASMUS project that ATC is not disturbed by up to five percent of current speed, for example, 10 kts CAS difference.

From a human machine interface (HMI) perspective, it could be advantageous to display upper speed margin and lower speed margin on Primary Flight Display, on Airbus aircraft for example, allowing the FMS to vary guidance speed target without creating pilot misunderstanding. That system using a similar concept would have to avoid the impact of the short term strategy on the immediate time error predictions which are used for the long term strategy.

In accordance with another exemplary embodiment, a method for providing reliability for both an aircraft four dimensional trajectory along a path to a waypoint and required time of arrival at the waypoint comprises enabling a temporary speed correction that compensates for current wind error in addition to a long term speed profile.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

What is claimed is:

1. A method for providing reliability for both a four dimensional trajectory of an aircraft along a path to a waypoint and a required time of arrival (RTA) at the waypoint, the aircraft including a flight management system processor including a trajectory predictor and an RTA solver, the method comprising:

enabling, by the flight management system processor, a temporary speed correction that compensates for unpredicted environmental errors in addition to a long term speed profile, the enabling step including:
  computing, by the trajectory predictor, a time error as a difference between an estimated time of arrival (ETA) and the RTA without use of a guidance margin, wherein the guidance margin is a target speed modification that would delay or prevent re-computation of the long term speed profile along the trajectory;
  setting, by the flight management system processor, a guidance speed as the target speed required to reach the waypoint at the RTA plus an updated guidance margin;
  computing, by the RTA solver, the guidance margin to delay or prevent a long term speed profile computation and reach the waypoint at the RTA if the time error exceeds an interval determined by a first positive time threshold and a first negative time threshold, which change in magnitude as the distance to the waypoint decreases;
  setting, by the RTA solver, a guidance margin to zero and setting the guidance speed to equal the target speed plus the guidance margin if a time error reduces under a second positive time threshold and a second negative time threshold;
  repeating from the computing of the time error.

2. The method of claim 1 wherein the setting of the target speed includes setting the guidance margin in consideration of a change in wind and temperature from that used to set the target speed.

3. The method of claim 1 wherein the guidance margin is adjusted, by the RTA solver, in consideration of wind and temperature errors, distance to the waypoint, and speed.

4. The method of claim 1 wherein the target speed is recomputed, by the RTA solver, if a time error exceeds the interval defined by a third positive threshold and a third negative threshold, such that the time error is not reduced.

5. The method of claim 1 wherein the first and second positive and negative time thresholds, and the second positive and negative time thresholds, are displayed on a display as funnels.

6. A method for providing reliability for both an aircraft four dimensional trajectory of an aircraft along a path to a waypoint and a required time of arrival (RTA) at the waypoint, the aircraft including a flight management system processor including a trajectory predictor and an RTA solver, the method comprising:

computing, by the flight management system processor, a first estimated speed to reach the waypoint at the required time of arrival;

computing, by the trajectory predictor, a time difference between an estimated time of arrival at the first estimated speed and the required time of arrival;

setting and maintaining, by the flight management system processor, a target speed equal to the first estimated speed required to reach the waypoint at the required time of arrival plus a guidance margin if the time difference between the estimated time of arrival and the required time of arrival exceeds a first time threshold, the first time threshold defined by an estimated time of arrival tolerance and an estimated time to the waypoint, the first time threshold decreasing in magnitude as a distance to the waypoint decreases and as long as it is larger than a third time threshold, wherein the third time threshold is less than the first time threshold, wherein the guidance margin is a speed delta applied to the first estimated speed;

updating, by the RTA solver, the target speed to equal a second estimated speed required to reach the waypoint at the required time of arrival plus the guidance margin if the difference between the estimated time of arrival and the required time of arrival exceeds a second time threshold, the second time threshold decreasing in magnitude as the distance to the waypoint decreases, and maintaining the guidance margin to compensate for accumulated time and position error in comparison to initial predicted trajectory; and setting, by the RTA solver, the guidance margin to zero and setting a guidance target speed to equal an estimated speed required to reach the waypoint at the RTA if the time difference goes below the third time threshold.

7. The method of claim 6 wherein the setting of the target speed includes setting the guidance margin in consideration of a change in wind and temperature from that used to set the target speed.

8. The method of claim 6 wherein the guidance margin is adjusted in consideration of wind and temperature errors, distance to the waypoint, and speed.

9. The method of claim 6 wherein the target speed is recomputed if a time error threshold is exceeded.

10. The method of claim 6 wherein the first and second time thresholds are displayed as funnels.

11. A system for providing reliability for both a four dimensional trajectory of an aircraft along a path to a waypoint and a required time of arrival at the waypoint, the system comprising:

a flight management system processor enabling a temporary speed correction that compensates for unpredicted environmental errors in addition to a long term speed profile, the enabling step including:

a required time of arrival solver configured to calculate a first estimated speed to reach the waypoint at the required time of arrival;

a trajectory predictor configured to compute in real time a time difference between an estimated time of arrival at the first estimated speed and the required time of arrival;

a speed profile generator configured to set and maintain a target speed equal to the first estimated speed required to reach the waypoint at the required time of arrival plus a guidance margin if the time difference between the estimated time of arrival and the required time of arrival exceeds a first time threshold, the first time threshold defined by an estimated time of arrival tolerance and the time to the waypoint and which decreases in magnitude as the distance to the waypoint decreases and as long as it is larger than a third time threshold, wherein the guidance margin is a speed delta applied to the first estimated speed;

wherein the required time of arrival solver is further configured to compute a second estimated speed required to reach the waypoint at the required time of arrival if a time error exceeds a second time threshold;

wherein the speed profile generator is further configured to update the target speed to equal the second estimated speed required to reach the waypoint at the required time of arrival plus the guidance margin if the time error exceeds a second time threshold and maintaining the guidance margin to compensate an accumulated time error, wherein the second time threshold is larger than the first time threshold; and wherein the speed profile generator is configured to set the guidance margin to zero and setting a guidance target speed to equal the second estimated speed required to reach the waypoint at the required time of arrival if the time difference goes below a third time threshold.

12. The system of claim 11 wherein the speed profile generator is further configured to set the guidance margin in consideration of a change in wind and temperature from that used to set the target speed.

13. The system of claim 11 wherein the speed profile generator is further configured to adjust the guidance margin in consideration of a current wind error, temperature error, distance to the waypoint, and speed.

14. The system of claim 11 wherein the speed profile generator is further configured to re-compute the target speed if a time error threshold is exceeded.

15. The system of claim 11 further comprising a display configured to display the first and second time thresholds as funnels.

16. The system of claim 11 wherein the required time of arrival solver is configured to compensate for time error.

17. The system of claim 11 wherein the required time of arrival solver is partially compensating time error to maintain the guidance margin application by the speed profile generator.

\* \* \* \* \*